United States Patent [19]
Patterson et al.

[11] Patent Number: 5,752,668
[45] Date of Patent: May 19, 1998

[54] TAPE LIBRARY CARTRIDGE MANIPULATION GRIPPER WITH Z-AXIS TRANSLATION

[75] Inventors: Scott R. Patterson; Joseph A. Stabile, both of Colorado Springs, Colo.

[73] Assignee: Philips Electronics North America Corporation, New York, N.Y.

[21] Appl. No.: 716,682

[22] Filed: Sep. 16, 1996

[51] Int. Cl.$^6$ ................................................ G11B 15/68
[52] U.S. Cl. ................................................ 242/337
[58] Field of Search ........................ 242/337, 338, 242/338.4; 360/92

[56] References Cited

U.S. PATENT DOCUMENTS 4,452,406  6/1984  Richard .

5,274,516  12/1993  Kakuta et al. ..................... 360/92

*Primary Examiner*—John P. Darling

[57] ABSTRACT

A cartridge manipulation gripper with bidirectional z-axis translation is mountable on an x-y positioning system for cartridge handling in a tape Library. The gripper incorporates a traction assembly for frictionally engaging a cartridge and drawing the cartridge through the gripper. The traction assembly includes a belt drive train mounted to a first side of the gripper frame and a reaction roller assembly mounted to a second side of the gripper frame opposite the belt drive train. Bidirectional translation of the gripper allows engagement by the traction and reaction roller assemblies with cartridges stored in a plurality of magazines and tape drive assemblies mounted in an opposing orientation with the x-y positioning system and gripper mounted intermediate the tape drives and magazines.

12 Claims, 13 Drawing Sheets

FIG.6H

TAPE LIBRARY CARTRIDGE MANIPULATION GRIPPER WITH Z-AXIS TRANSLATION

BACKGROUND OF THE INVENTION

1. Field of the Invention

The present invention relates generally to multiple cassette tape storage libraries with random access cartridge handling. More particularly, the present invention provides a cassette retrieval device employing an elevator carried on an x-y positioning mechanism. The elevator incorporates a friction belt gripper having +/− z-axis translation and cassette pass through handling with cam actuated belt and roller grip closure.

2. Description of Related Art

Magnetic tape storage libraries employed for off-line storage of data for archival or short term backup predominantly employ single reel tape cartridges such as the Model 3480 tape cartridge developed by IBM corporation or the Quantum/Digital DLT cartridge. Operation of the IBM 3480 tape cartridge is disclosed in U.S. Pat. No. 4,452,406. The DLT cartridge employs similar functional characteristics in a case having slightly smaller width and length dimensions than the 3480 cartridge. Each cartridge includes a single reel containing a quantity of magnetic tape stored in a substantially rectangular enclosure with an aperture on one major face to receive a rotating capstan for the tape reel. An aperture in one corner of the cartridge allows access to the free end of the tape web by the tape transport unit.

Individual tape transport units are well known in the industry and the development of tape libraries was accomplished to allow automatic retrieval of cartridges for insertion into one or more tape transport units. Initial tape libraries employed vertical arrays of tape cartridges which could be sequentially dropped into a loading position for introduction into an associated tape transport unit. After use, each tape cartridge was then ejected from the tape transport unit and received in a collection area. However, such approaches lacked random access capability. Storage devices employing magazines capable of accepting an array of tape cartridges were developed with vertical movement of the cartridges relative to a stationary tape transport unit employed for positioning selected tape cartridges. These devices typically require significant vertical space to provide magazine actuation travel.

True random access capability has been provided through tape storage libraries employing magazines having vertically stacked cartridges accessible by an elevator retrieval mechanism which transports cartridges to and from the magazine and tape drive unit. Exemplary of this type of storage library is the Philips Laser Magnetic Storage Division (LMS) "Cartridge Stacker Loader" (CSL).

It is desirable to provide multiple magazine capability for increased cartridge storage while maintaining minimal height and footprint for the tape storage library. While tape storage libraries employing multiple access retrieval mechanisms for separate vertical stacks of cartridges are in commercial development. Such devices typically require non-standard footprint sizes due to mechanical operating constraints. It is therefore desirable to provide a multiple magazine tape storage library employing a multiple access retrieval system capable of supplying cartridges to multiple tape transport units on a random access basis while maintaining a footprint suitable for mounting in conventional equipment rack dimensions.

The use of multiple magazines provides additional complexity in inventorying of cartridges stored in the library. It is desirable that cassettes be individually removable from the magazines without magazine removal and that magazines be removable for group handling of cartridges. To obtain configuration control of cartridges stored in the library, it is therefore desirable that the tape library incorporate a separate cartridge insertion and removal port or mailbox to allow automated positioning of cartridges by the tape library system. Additionally, sensing of general access to the magazines and individual magazine removal or replacement or individual cartridge removal or replacement from a magazine is desirable for recovering configuration control when the mailbox is not employed.

Cartridge retaining mechanisms on magazines employed within the tape library must allow access to and removal of the cartridge from the front of the magazine by an operator/user and from the rear of the magazine by the cartridge manipulation mechanism. Pass-through retaining mechanisms such as that employed in the Philips LMS CSL tape storage library have demonstrated satisfactory performance. However, it is desirable to provide the capability for release of the retention mechanism which is self-aligning and can tolerate dimensional variation imposed by operation of the cartridge retrieval mechanism.

SUMMARY OF THE INVENTION

A tape storage library incorporating the present invention employs multiple cartridge magazines, each providing vertically distributed slots for cartridge storage. The magazines are arranged in adjacent, horizontal relation providing an x-y array of cartridges in the tape storage library. The magazines are removably restrained in a frame mounted in a front bay of the tape storage library.

A cartridge retrieval mechanism positioned in an open bay rearwardly adjacent the magazine frames includes an x-axis frame supporting an elevator platform which incorporates a gripper mechanism for retrieval of individual cartridges. The elevator platform translates along the x-axis frame defining a first motion axis.

The x-axis frame is cantilevered from a pillow block assembly which translates along a y-axis rail defining the second axis of motion for the cartridge retrieval assembly. Rotation of the cantilevered x-axis frame about the y-axis rail is restrained by a slotted guide mounted proximate one end of the x-axis frame which receives a vertical flange mounted parallel to the y-axis rail.

A gripper for cartridge handling is mounted to the elevator. The gripper is aligned with individual cartridges contained within the magazines by the x and y motion of the elevator and similarly positioned for placement of cartridges in a tape transport unit. A plurality of tape transport units is mounted in a bay rearwardly adjacent the bay containing the x-axis frame. The gripper mechanism provides pass through handling of tape cartridges for insertion and removal from the tape transport units.

The present invention is embodied in a gripper having a traction assembly for frictionally engaging a cartridge and drawing cartridge through the gripper. The gripper is mounted to an elevator with a mounting plate bidirectionally translatable in a z axis perpendicular to an x-y array of cartridges. The mounting plate is translated using a stepper motor mounted to the elevator or gripper frame.

The traction assembly includes a belt drive train mounted to a first side of the gripper frame. The drive train supports a belt for frictionally engaging a cartridge. A reaction roller assembly is mounted to a second side of the gripper frame opposite the belt drive train in spaced relation to cooperatively engage a second side of the cartridge.

BRIEF DESCRIPTION OF THE DRAWINGS

The present invention is best understood with reference to the following drawings and detailed description wherein.

DETAILED DESCRIPTION OF THE INVENTION

Figure 1:
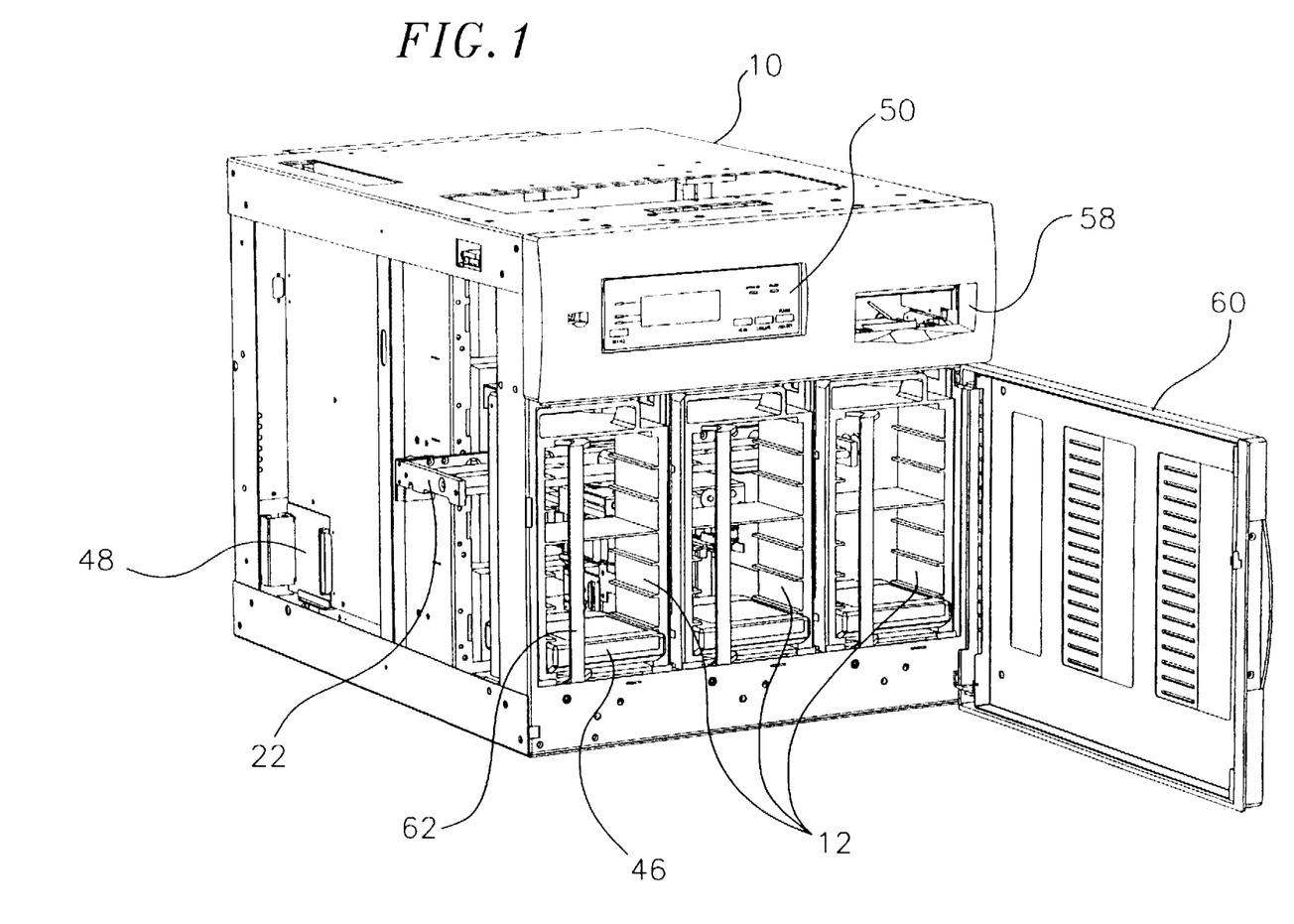
FIG. 1 is a front pictorial view of a tape library incorporating the present invention with the front door and left side panel removed.

Referring to the drawings, FIGS. 1–4 disclose a multi-cartridge tape library incorporating the present invention. The library is housed in an enclosure 10 which, n the embodiment disclosed in the drawings, is suitable for mounting in a conventional 19 inch electronic equipment rack. As best seen in FIG. 1, the present embodiment employs three cartridge magazines 12 which are mounted in frames 14 in a front bay or portion of the enclosure designated 16. A cartridge manipulation unit 18 is mounted in a second bay of the enclosure generally designated 20 immediately rearward of the magazine bay. The cartridge manipulation unit includes an x-y position system which incorporates an x-axis frame 22 and a y-axis rail 24. The x-axis frame is cantilevered from a pillow block assembly 26 carried by the y-axis rail. An elevator assembly 28 is supported by the x-axis frame. Translation of the elevator assembly along the x-axis frame defines a first motion axis for the cartridge manipulation system. Translation of the pillow block assembly on the y-axis rail defines a second axis of motion for the cartridge manipulation system.

A detailed description of the features of the x-y position system is provided in co-pending patent application Ser. NO. 08/716,683, attorney docket number 7004-0097, entitled Tape Library Cartridge Manipulation X-Y Positioning System, the disclosure of which is incorporated herein in its entirety by reference.

Figure 2:
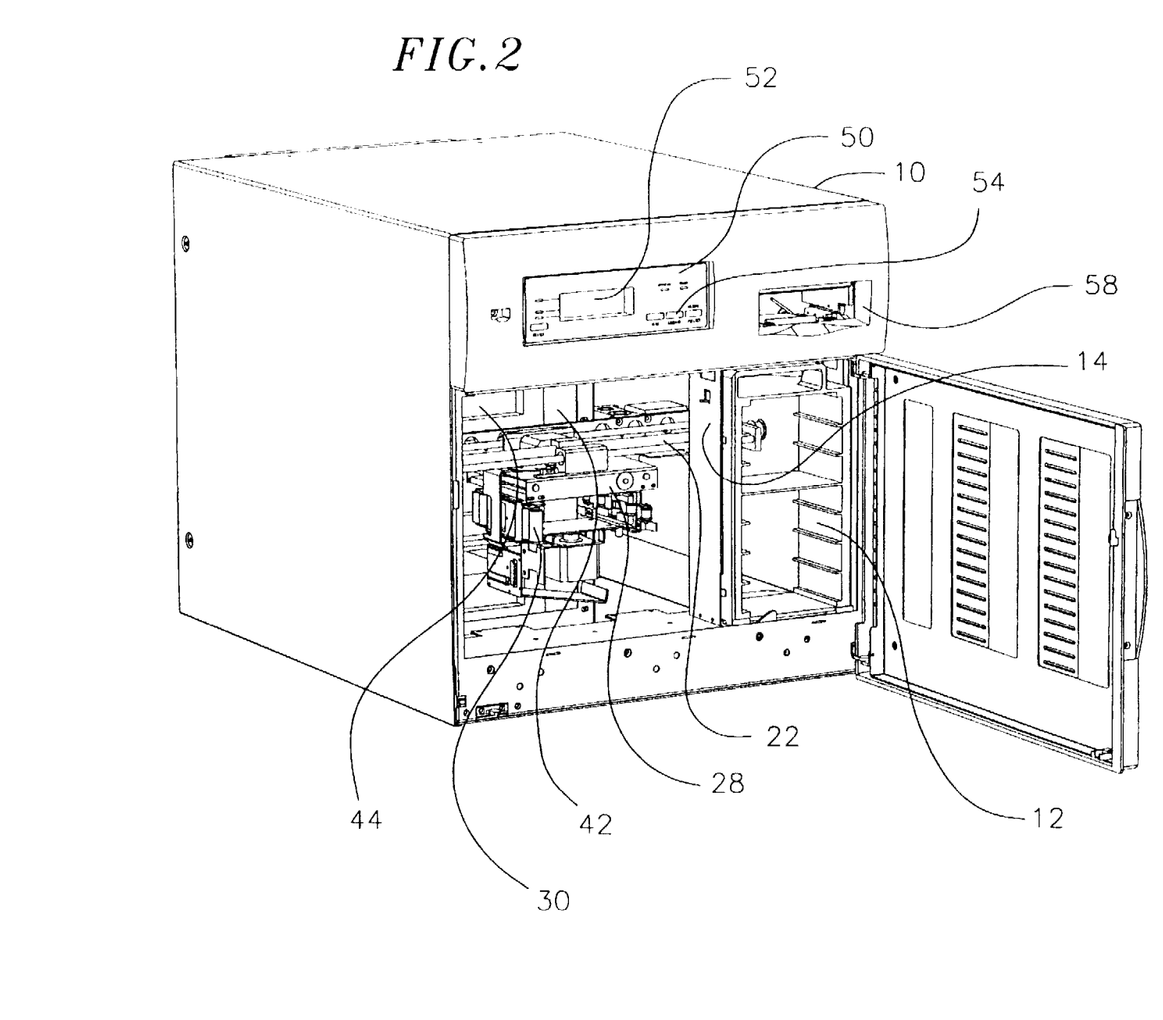
FIG. 2 is a front pictorial view of the tape library of FIG. 1 with two magazines and their associated frames removed to display the cartridge retrieval mechanism.

The elevator assembly incorporates a gripper mechanism 30 for retrieval of individual tape cartridges. The gripper mechanism is movably mounted to an elevator platform 32 and provides a belt drive train 34 which cooperates with opposing roller assembly 36. Details of the elevator assembly are best seen in FIGS. 6a–6h. The gripper assembly translates on a third motion axis providing +z and –z motion for the cartridge manipulation assembly. Relative position of the elevator assembly in the library is best seen in FIG. 2 which provides a front isometric view of the enclosure with two magazines and their associated mounting frame removed. A tape cartridge 46 shown carried within the gripper assembly.

A third bay in the enclosure generally designated 38 houses four tape drive units 40 for the embodiment shown in the drawings. Each tape drive is integrally mounted in a support chassis received in frame 42 within the enclosure. The cartridge insertion aperture 44 of each tape drive unit is exposed to the cartridge manipulation system operating in the immediately adjacent bay.

An electronics board 48 is mounted in the aft bay of the library enclosure adjacent the tape drive stack in the embodiment shown in the drawings. A central processing unit, memory and electronic control circuitry for the library are mounted on the controller board. Operator interface is accomplished through a control panel 50 mounted on the front face of the enclosure which includes a display 52 for communication with the operator and input keys 54 for manual input by the operator. Communications by the tape library with a user network or other computer devices is accomplished through industry-standard communications interfaces.

Figure 3:
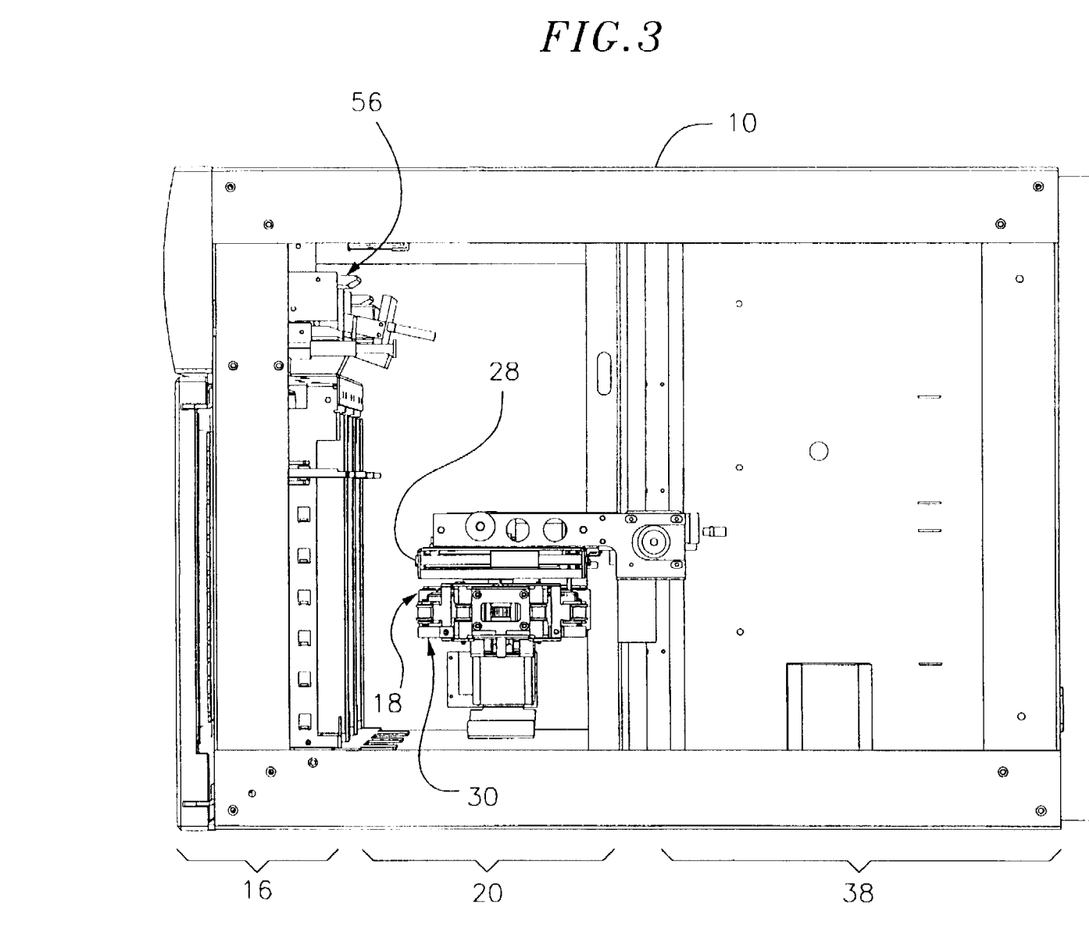
FIG. 3 is a right side pictorial view of the tape library with the side panel removed.
Figure 4:
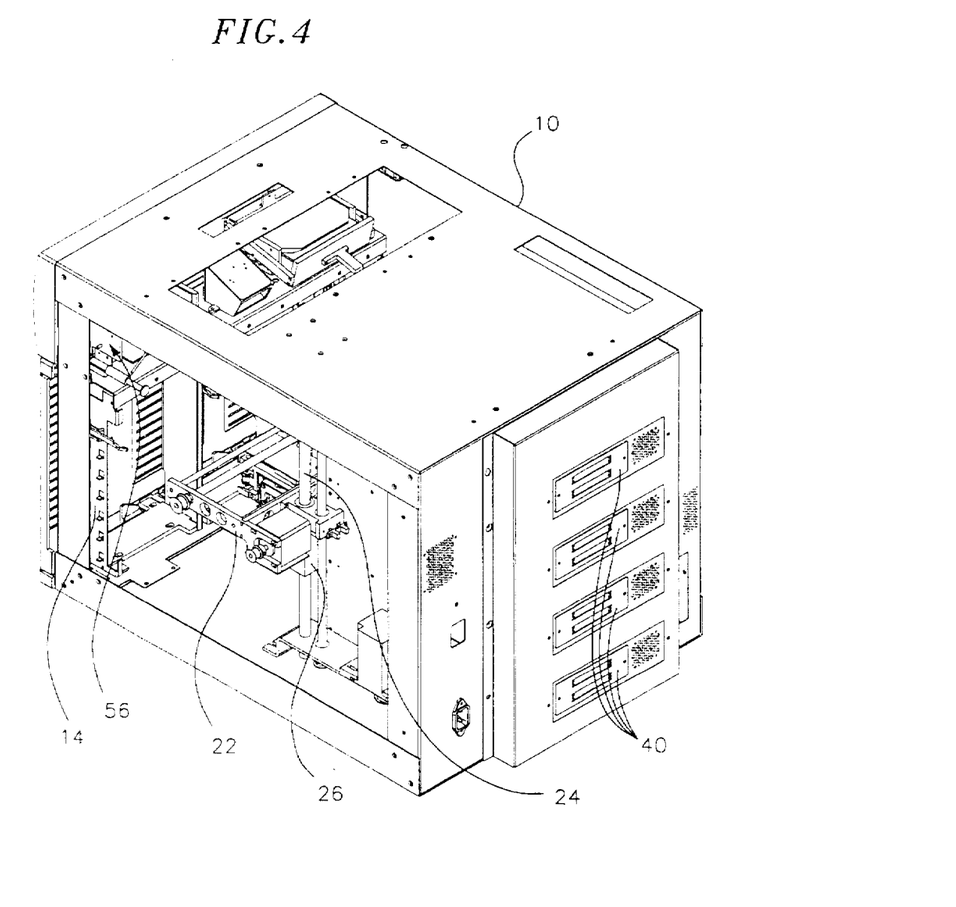
FIG. 4 is a left rear perspective of the tape library with the top and left side panels removed to display elements of the mailbox and cartridge retrieval mechanism.

A tape cartridge mailbox assembly 56, seen in FIG. 3, is included in the tape library to allow automated handling of cartridges for individual insertion and removal from the library. The mailbox assembly incorporates a cartridge receiving aperture 58 on the library front face. Cartridges inserted to the mailbox are retrieved by the cartridge manipulation assembly for direct placement in a tape drive assembly or cataloguing in an open magazine slot. Similarly, tape cartridges retrieved by the manipulation assembly from the tape drive or a magazine location are unloaded from the library through the mailbox to be retrieved by an operator.

The tape library as disclosed in the drawings also allows manual cartridge manipulation by an operator through door 60, which exposes the three magazines when opened. The individual magazines are removable from the library, allowing handling of cartridges in seven-unit multiples, and individual cartridges are removable from the magazines directly by rotation of the cartridge stop 62 allowing access to individual cartridges stored in the magazine.

A detailed description of the structure and operation of the mailbox assembly, cartridge magazine and cartridge release assemblies is provided in co-pending patent application Ser. No. 08/716,685, attorney docket number 7004-0098/0099/0101, entitled Tape Library Cartridge Storage and Control System, the disclosure of which is incorporated herein in its entirety by reference.

Figure 5:
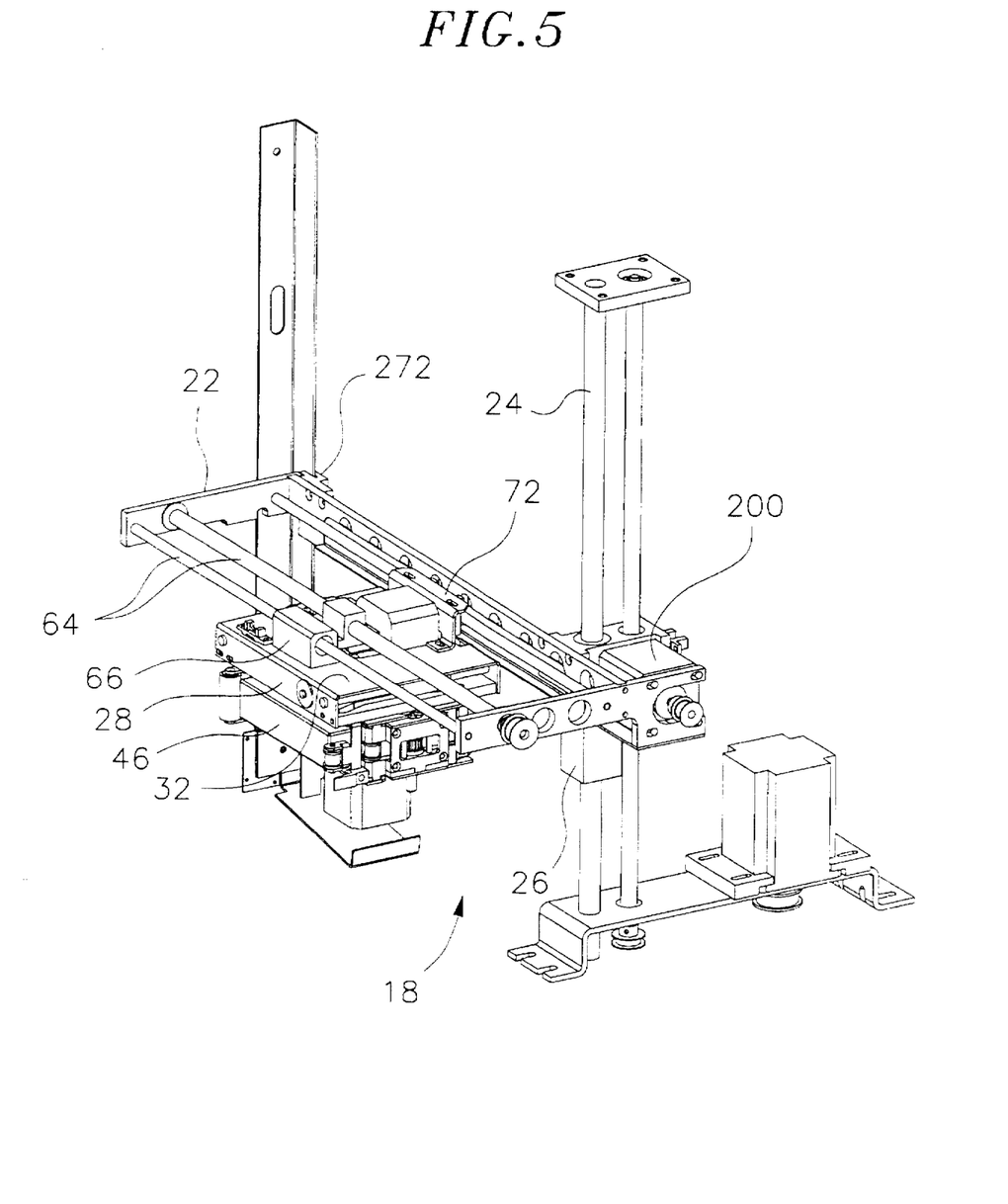
FIG. 5 is a pictorial view of the cartridge retrieval mechanism.

As best seen in FIG. 5, the elevator assembly is carried by the x-axis frame 22, which incorporates two parallel guide rails 64. One rail is traversed by a linear bearing 66 which is mounted to the top of the elevator platform. The second rail is engaged by C-shaped glider 68, best seen in FIG. 6c, and inverted J-shaped glider 70, best seen in FIG. 6d. The gliders are adjustably mounted to bracket 72, which is in turn mounted to the elevator platform. The J and C shaped gliders contact the second rail tangentially at the top of the rail thereby providing tolerance relief for spacing of the guide rails. The entire elevator assembly traverses along the x-axis frame while the x-axis frame is in turn translated along the y-axis rail for positioning of the gripper assembly in an x-y plane for cartridge manipulation alignment.

Figure 6A:
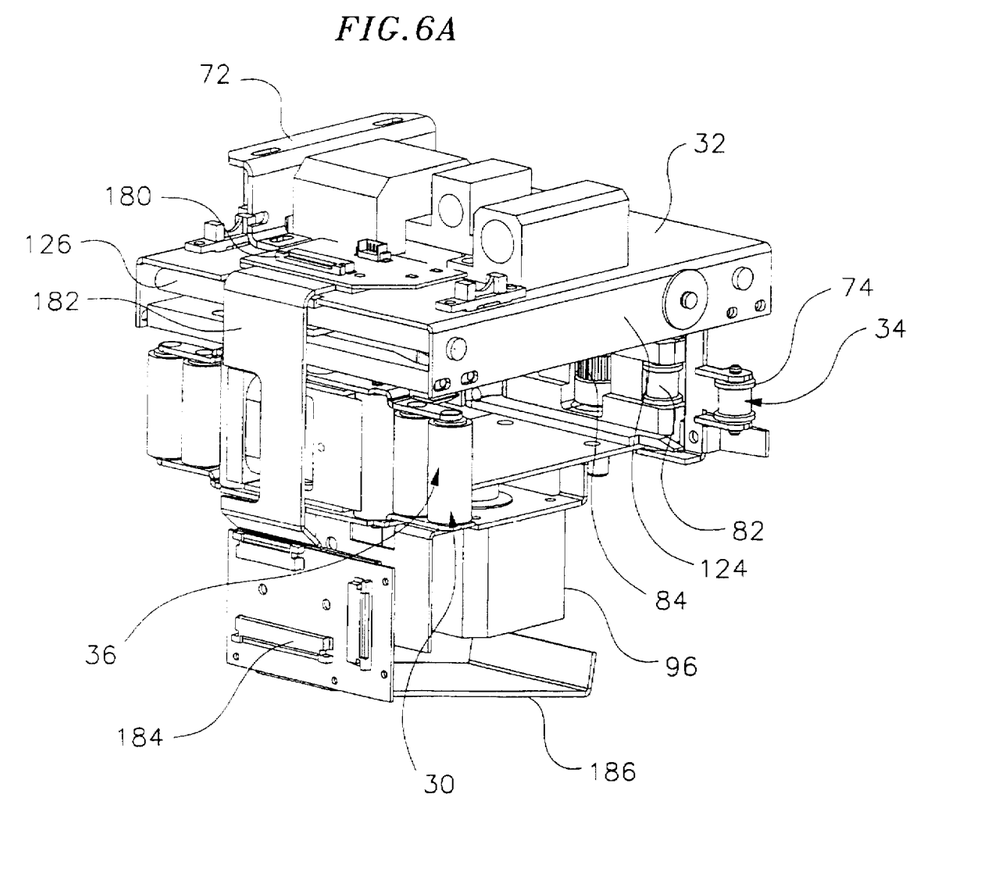
FIG. 6a is a front perspective view of the elevator assembly.
Figure 6B:
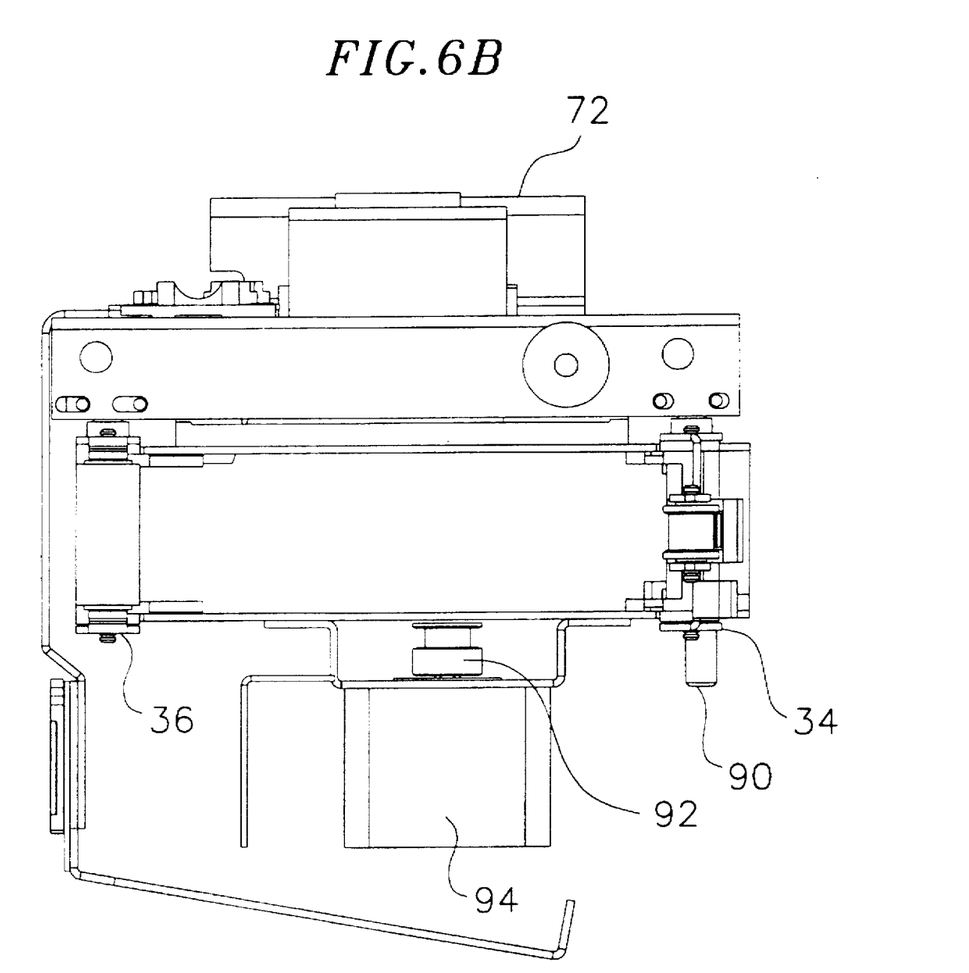
FIG. 6b is a front elevational view of the elevator assembly.
Figure 6C:
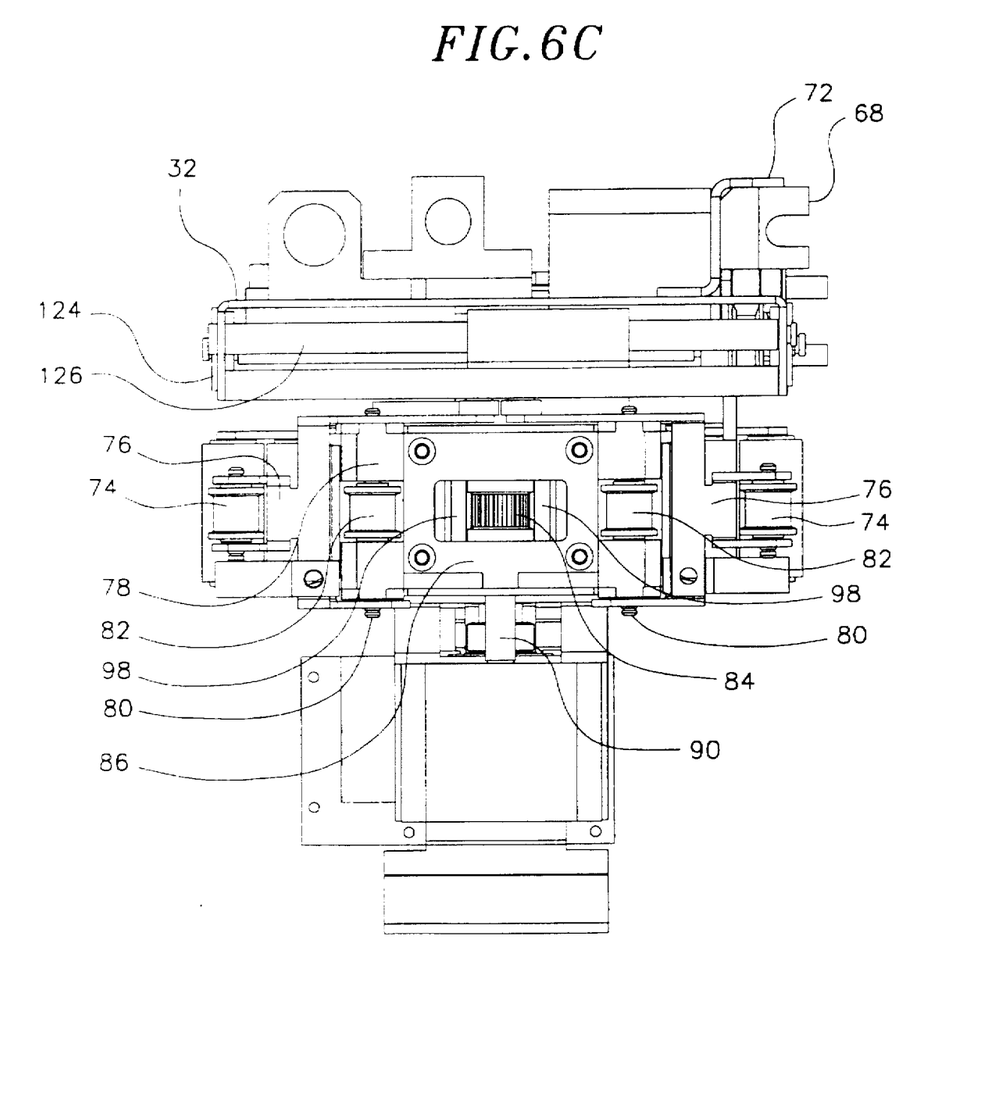
FIG. 6c is a right side elevational view of the elevator assembly.
Figure 6D:
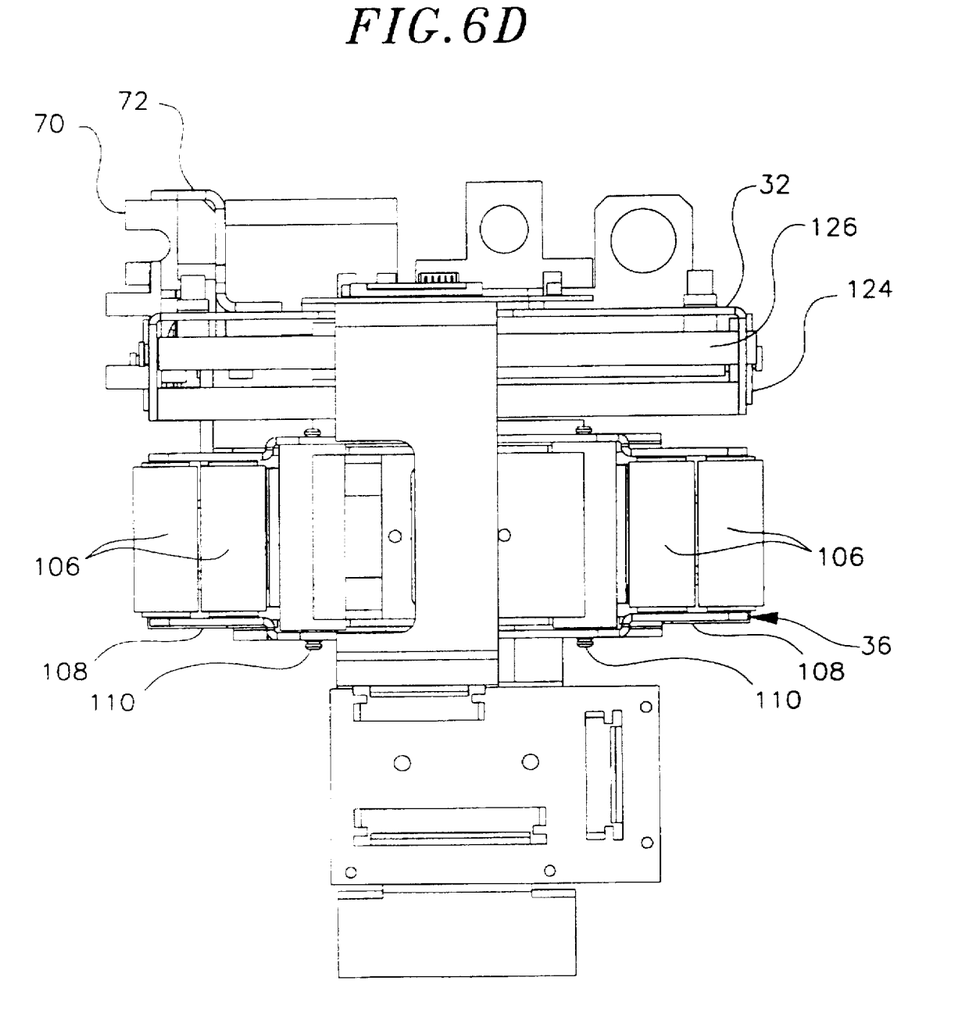
FIG. 6d is a left side elevational view of the elevator assembly.
Figure 6E:
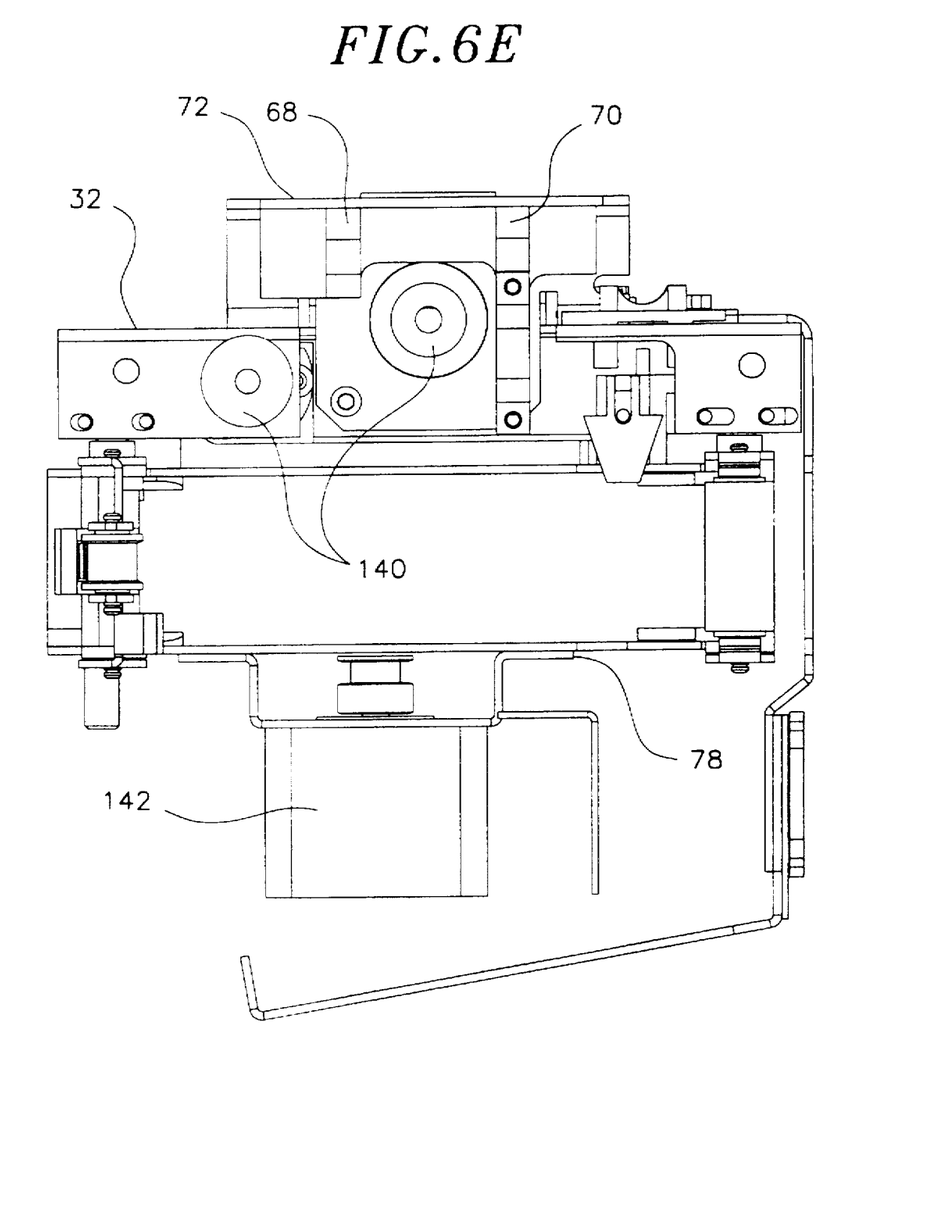
FIG. 6e is a rear view of the elevator assembly.
Figure 6F:
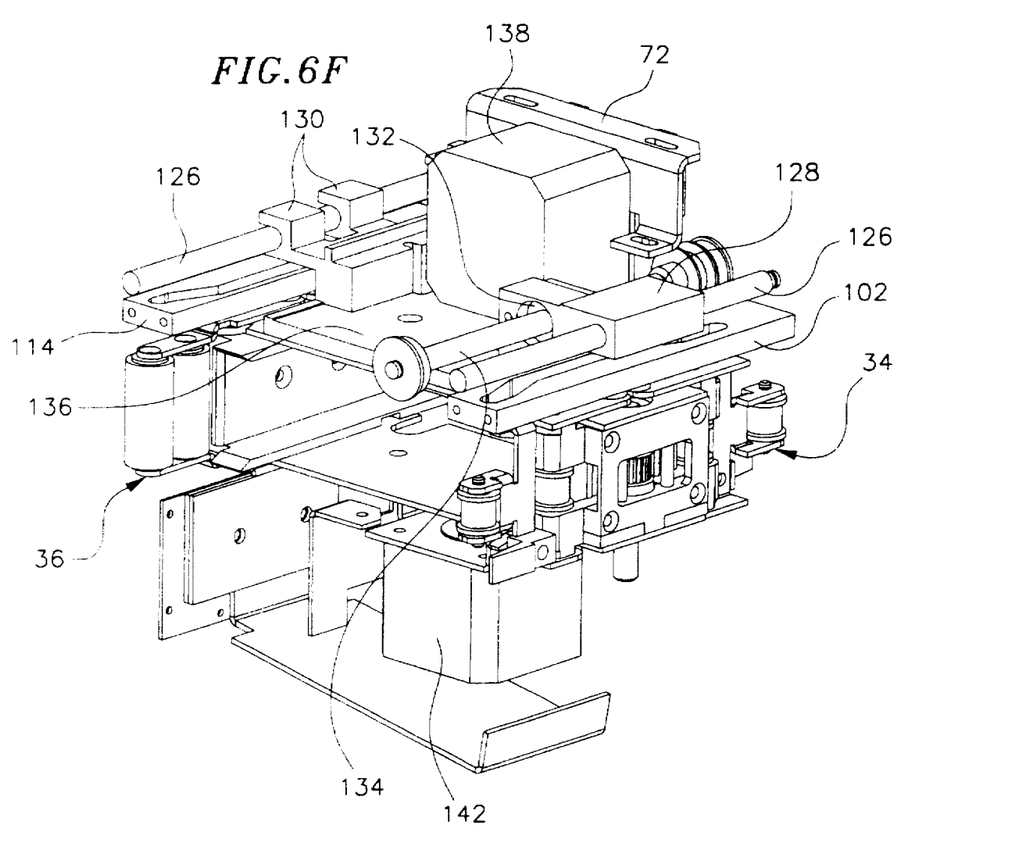
FIG. 6f is a front perspective view of the elevator assembly with the elevator platform and associated frames removed to display underlying components.

The gripper is movable bidirectionally relative to the elevator platform in a +z and −z direction, as will be described in greater detail subsequently. A traction assembly having a friction drive belt and cooperating reaction rollers, mounted in spaced relation to receive a cartridge between the belt and rollers, provides the capability to frictionally engage cartridges in the library array and draw them through the gripper. The gripper belt drive train 34 incorporates peripheral rollers 74 which are mounted on pivoting brackets 76. These brackets are in turn mounted to the gripper frame 78 by pivot pins 80. Details of this structure are best seen in FIG. 6h. Inner rollers 82 are mounted coaxially with the pivot pins.

A drive capstan 84 is centrally mounted in the belt drive train, supported by a side cradle 86. The capstan includes a central drive gear, which engages the gripper belt 88 (shown in phantom in FIG. 6g), and upper and lower bearing mounts carried in the side cradle above and below the drive gear. The capstan shaft 90 extends below the side cradle to engage a pulley belt 92 driven by reversible stepper motor 94, which is mounted to a bottom plate of the gripper frame. Two roll pins 98 are mounted in the side cradle on either side of the capstan, urging the gripper belt onto the drive gear and maintaining belt tension. Alternative embodiments employ multiple rollers positioned on each side of the capstan drive gear in the side cradle to maintain belt tension.

An inboard arm on each of the pivot brackets carries a linear cam follower 100 as best seen in FIG. 6h. During translation of the gripper assembly in the +/− z-axis directions, the cam followers are controlled by the contour of the race in linear cam block 102, best seen in FIGS. 6f and 6g. The outboard cam follower, with respect to the relative +/− z-axis motion of the gripper assembly, is driven into a laterally translated portion 104 of the linear cam for the extended portion of the gripper travel. Location of the cam follower opposite the pivot point from the peripheral roller urges the peripheral roller inward for increased pressure on a tape cartridge engaged by the gripper mechanism. Conversely, the inboard cam follower, relative to the direction of motion of the gripper mechanism, remains in the untranslated portion of the cam track. Adjustment of the center of pressure exerted by the gripper belt on a cartridge being manipulated is adjustable at the lateral extents of the +/− z-axis gripper motion by contouring of the linear cam track.e The reaction roller assembly 36 which cooperates with the belt drive train is best seen in FIGS. 6d and 6h. As with the belt drive train, cooperating reaction rollers 106 are mounted on pivoting brackets 108. The rollers are carried on an outboard arm of the bracket with respect to pivot pin 110 while the inboard arm of each of the pivoting brackets carries a cam follower 112 best seen in FIG. 6h. As previously described for the belt drive train, during translation of the gripper assembly in the +/− z-axis directions, a linear cam block 114, best seen in FIG. 6g, controls the cam followers such that the outboard cam follower with respect to the relative +/− z-axis motion is driven into laterally translated portions 116 of the cam track. Based on the location of the cam follower opposite the pivot point from the outboard rollers, the pivoting bracket urges the rollers inward, increasing pressure on the tape cartridge in cooperation with the outer roller of the belt drive assembly.

Figure 6G:
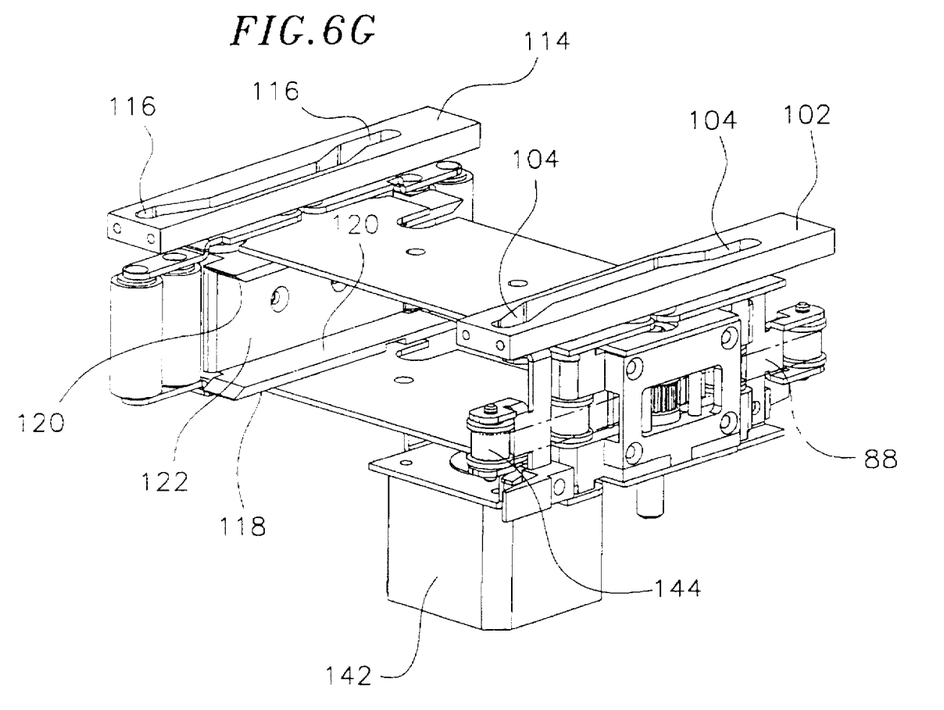
FIG. 6g is a front perspective view of the gripper assembly elements including linear cam blocks.
Figure 6H:
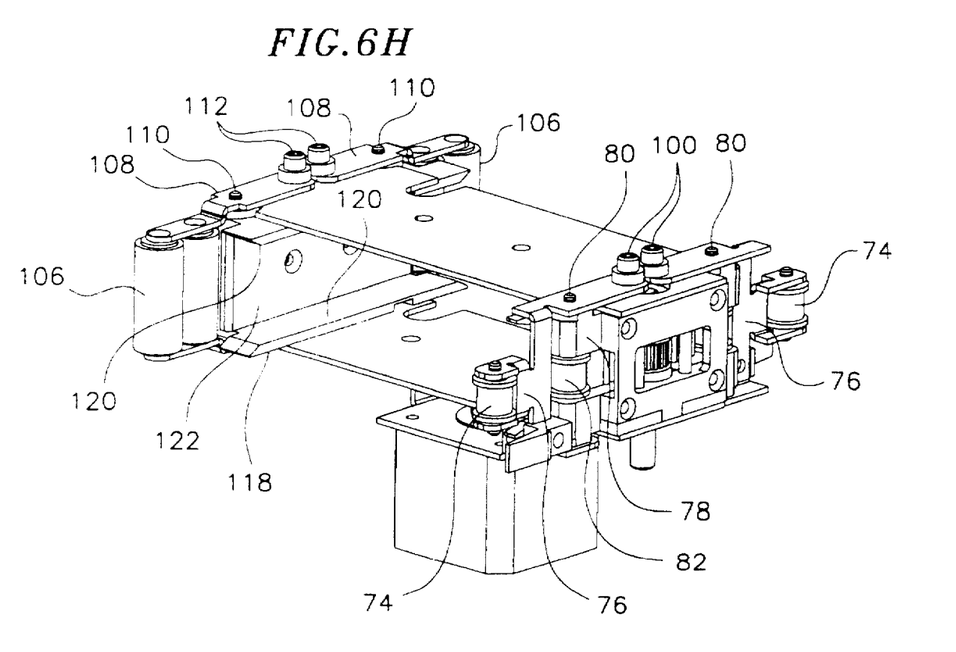
FIG. 6h is a front perspective view of the gripper assembly with the linear cam blocks removed to display the cam follower arrangement.

A cartridge guide 118, best seen in FIGS. 6g and 6h, incorporates vertically opposed slide plates 120 and a smooth vertical side wall 122 for guiding the tape cartridges while passing through the gripper unit. Sloped approach aprons on the upper and lower cartridge slide plates accommodates slight misalignment between the gripper assembly and cartridge while the gripper is drawing the cartridge into the gripper frame from either direction.

In an exemplary operating sequence, the gripper assembly is positioned adjacent a cartridge slot in one of the tape library magazines or the mailbox by the x-y positioning system. The gripper assembly is extended in the +z direction with the drive belt operating in a first direction, as will be described in greater detail subsequently. As the gripper mechanism approaches the extent of its +z motion, the cam followers on the drive belt roller brackets and reaction roller assembly brackets cause the belt and reaction rollers to "pinch" the cartridge which, urged by the drive belt rotated in a forward direction by the stepper motor, is withdrawn from its storage slot into the gripper assembly. The gripper assembly is then withdrawn to a zero position on the z-axis providing even force distribution between both sides of the belt train and roller assembly. The gripper mechanism is then positioned adjacent the cartridge aperture of one of the plurality of tape drives and the gripper assembly translates in the −z direction for affirmative positioning of the cartridge in the tape drive. As the cartridge enters the tape drive, the belt drive is engaged to pass the tape cartridge through the gripper mechanism. As the gripper assembly approaches the extent of its −z travel, the cam followers on the pivoting brackets urge the belt drive roller and outboard rollers into higher pressure contact with the tape cartridge providing affirmative motion control for insertion of the cartridge into the tape drive.

Upon ejection of the tape cartridge from the tape drive, the described manipulation process is reversed, with the belt driven by the stepper motor in a reverse direction, to return the cartridge to its magazine slot or other handling as appropriate. It should be noted that the cartridge manipulation system is available for handling of other cartridges with other tape drives during operation of the first drive.

The structure allowing z-axis motion of the gripper assembly relative to the elevator platform is best seen in FIGS. 6a, 6c, 6d and 6f. Depending sides 124 of the elevator platform support z-axis rails 126. A z-axis pillow block assembly 128 incorporates a linear bushing receiving the first z-axis rail while c-shaped gliders 130 engage the second z-axis rail. As with the support of the elevator assembly on the x-axis frame, the c-shaped gliders contact the rail only at the top tangency point and provide lateral tolerance for positioning of the z-axis rails.

The z-axis pillow block assembly and c-shaped gliders are integrally formed with or mounted to a z-axis mount plate 136. The gripper frame 78 is suspended from the z-axis mount plate. The z-axis pillow block assembly also engages a lead nut 132 which receives z-axis lead screw 134. The z-axis lead screw is supported by the depending elevator platform sides in appropriate bushings or bearings.

Linear cam blocks 102 and 114 are rigidly supported by the depending sides of the elevator platform vertically adjacent the z-axis guide rods.

A z-axis stepper motor 138, supported by the z-axis mount plate, drives the z-axis lead screw through a belt connecting pulleys 140 as best seen in FIG. 6e. A belt drive train stepper motor 142 is suspended from the bottom of the gripper frame and rotates the belt drive capstan through a drive belt engaging pulley 144. Placement of the two stepper motors on the top and bottom of the elevator assembly provides an exceptionally small footprint for the elevator assembly within the tape library.

Translation of the gripper in Z axis for the present invention requires special considerations for routing and handling of flexible cable connecting the various electrical elements on the elevator and gripper to the tape library controller and power supply. Flexible cables mounted to connectors 180 mounted on the top of the elevator are routed past cable spacer 182 around the side of the elevator assembly. Those cables and additional cables connected to connector plate 184 are routed along cable deflector 186 parallel to the X axis allowing translation of the elevator with flexible cable folding parallel to the axis. Z axis translation of the gripper and associated belt drive motor 96 would present the opportunity for snagging of the looped ribbon cable by the case of the belt drive motor. The resilient cable deflector 186 maintains the cable spacing from the Z axis translating components.

Having now described the invention, as required by the patent statutes, those skilled in the art will recognize modifications and substitutions for the elements of the embodiments disclosed. Such modifications and substitutions are within the scope and intent of the invention as defined in the following claims.

What is claimed is:

1. An apparatus for manipulation of cartridges arranged in an x-y array in a tape library, said apparatus adapted for mounting to an elevator carried by an x-y positioning system, the apparatus comprising:

a gripper having a traction means for frictionally engaging a cartridge and drawing said cartridge through the gripper, the gripper including a frame and the traction means comprising i) a belt drive train mounted to a first side of the gripper frame, the drive train carrying a belt for frictionally engaging a cartridge and ii) a roller assembly mounted to a second side of the gripper frame opposite the belt drive train in spaced relation to cooperatively engage a second side of the cartridge;

means for mounting the gripper to an elevator, said mounting means bidirectionally translatable in a z axis perpendicular to an x-y array of cartridges; and means for translating the mounting means.

2. An apparatus as defined in claim 1 wherein the belt drive train comprises:

a first peripheral roller supporting the drive belt and carried by a bracket pivotally mounted to the gripper frame;

means for pivoting the first bracket to urge the first roller and drive belt into firm engagement with the cartridge;

a second peripheral roller supporting the drive belt and carried by a second bracket pivotally mounted to the gripper frame opposite the first bracket; and means for pivoting the second bracket to urge the second peripheral roller and drive belt into firm engagement with the cartridge.

3. An apparatus as defined in claim 2 wherein the means for pivoting the first bracket is actuated cooperatively with translation of the mounting means in a first direction in the z-axis and the means for pivoting the second bracket is actuated cooperatively with translation of the mounting means in a second direction on the z-axis.

4. An apparatus as defined in claim 3 wherein the reaction roller assembly comprises:

at least one reaction roller carried by a first roller bracket pivotally mounted to the gripper frame;

at least one reaction roller carried by a second roller bracket pivotally mounted to the gripper frame opposite the first roller bracket;

means for pivoting said first roller bracket to urge the roller carried thereby into firm engagement with the cartridge; and means for pivoting the second roller bracket to urge the roller carried thereby into firm engagement with the cartridge;

wherein the means for pivoting the first roller bracket is actuated cooperatively with translation of the mounting means in a first direction in the z-axis and the means for pivoting the second roller bracket is actuated cooperatively with translation of the mounting means in a second direction on the z-axis.

5. An apparatus as defined in claim 4 wherein the means for pivoting the first bracket comprises a first cam follower said means for pivoting the second bracket comprises a second cam follower, the means for pivoting the first roller bracket comprises a third cam follower and the means for pivoting the second roller comprises a fourth cam follower and further comprising:

a first cam race mounted to the elevator and receiving the first and second cam followers;

a second cam race mounted to the elevator and receiving the third and fourth cam followers;

the contours of said first cam race and said second cam race cooperatively positioned to simultaneously urge the first peripheral roller with the supported belt and first reaction roller into firm engagement with the cartridge upon translation of the gripper in the +z direction, thereby pinching the cartridge; and the contours of the first cam race and second cam race cooperatively positioned to simultaneously urge the second peripheral roller with the supported belt and second reaction roller into firm engagement with the cartridge to pinch the cartridge upon translation of the gripper in the −z direction.

6. An apparatus as defined in claim 2 wherein the roller assembly comprises:

at least one reaction roller carried by a first roller bracket pivotally mounted to the gripper frame;

at least one reaction roller carried by a second roller bracket pivotally mounted to the gripper frame opposite the first roller bracket;

means for pivoting said first roller bracket to urge the roller carried thereby into firm engagement with the cartridge; and means for pivoting the second roller bracket to urge the roller carried thereby into firm engagement with the cartridge.

7. An apparatus as defined in claim 6 wherein the means for pivoting the first roller bracket is actuated cooperatively with translation of the mounting means in a first direction in the z-axis and the means for pivoting the second roller bracket is actuated cooperatively with translation of the mounting means in a second direction on the z-axis.

8. An apparatus as defined in claim 2 wherein the belt drive train further comprises a first inner roller mounted coaxially with a pivot pin engaging the first bracket to the frame and a second inner roller mounted coaxially with a second pivot pin engaging the second bracket to the gripper frame.

9. An apparatus as defined in claim 8 wherein the drive means comprises:

a capstan centrally mounted between the first and second inner rollers; and a belt stepper motor operatively engaged to drive the capstan.

10. An apparatus as defined in claim 1 wherein the gripper includes a frame and the mounting means comprises:

slide rails mounted to the elevator in parallel spaced relation;

a pillow block mounted to the gripper frame and slidably receiving one of said rails; and at least one glider mounted to the gripper frame for sliding engagement on the second rail, said glider tangentially contacting said second rail perpendicular to the z-axis.

11. An apparatus as defined in claim 10 wherein the translating means comprises:

a lead screw parallel to the slide rails and rotatably carried by the elevator;

a lead nut mounted to the gripper frame and operable receiving the lead screw; and a reversible z-axis stepper motor operatively engaged to the lead screw.

12. An apparatus as defined in claim 11 wherein the z-axis stepper motor and the belt stepper motor are mounted above and below the gripper frame for a reduced x-z footprint.

* * * * *